US011175746B1

(12) United States Patent
Ferreira et al.

(10) Patent No.: US 11,175,746 B1
(45) Date of Patent: Nov. 16, 2021

(54) ANIMATION-BASED AUTO-COMPLETE SUGGESTION

(71) Applicant: Lenovo (Singapore) Pte. Ltd., Singapore (SG)

(72) Inventors: Marcelo Ferreira, Campinas (BR); Jeniffer Lensk, Votorantim (BR); Jampierre Vieira Rocha, Itambacuri (BR); Hildebrando Lima Neto, Carapicuiba (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/060,548

(22) Filed: Oct. 1, 2020

(51) Int. Cl.
*G06F 3/023* (2006.01)
*G06F 40/274* (2020.01)
*G06F 3/0484* (2013.01)
*G06T 13/80* (2011.01)
*G06F 3/0481* (2013.01)

(52) U.S. Cl.
CPC .......... *G06F 3/0237* (2013.01); *G06F 3/0236* (2013.01); *G06F 3/0481* (2013.01); *G06F 3/04842* (2013.01); *G06F 40/274* (2020.01); *G06T 13/80* (2013.01)

(58) Field of Classification Search
CPC .... G06F 3/0237; G06F 40/274; G06F 3/0236; G06F 3/0481; G06F 3/04842; G06T 13/80
See application file for complete search history.

(56) References Cited

U.S. PATENT DOCUMENTS 8,566,075 B1 * 10/2013 Bruner .................... G06F 40/55 704/2
2017/0308290 A1 * 10/2017 Patel ................... G06F 3/04817

OTHER PUBLICATIONS

Wecapable, "WeCapable: Text to Sign Language (ASL) Converter", available: Mar. 15, 2019, https://wecapable.com/tools/text-to-sign-language-converter/, https://web.archive.Org/web/20190315160043/https://wecapable.com/tools/text-to-sign-language-converter/ (Year: 2019).*

* cited by examiner

*Primary Examiner* — Seth A Silverman
(74) *Attorney, Agent, or Firm* — Ference & Associates LLC

(57) ABSTRACT

One embodiment provides a method, including: receiving, on a keyboard of an information handling device, typing input from a user, wherein the typing input comprises at least one letter; determining, using a processor, at least one completion suggestion stemming from the at least one letter; and presenting, responsive to the determining, the at least one completion suggestion to the user, wherein the presented at least one completion suggestion comprises at least one animation portraying a signed motion corresponding to the at least one completion suggestion. Other aspects are described and claimed.

16 Claims, 4 Drawing Sheets

ANIMATION-BASED AUTO-COMPLETE SUGGESTION

BACKGROUND

Individuals frequently utilize a physical or digital keyboard to provide inputs to their information handling devices ("devices"), for example laptops and/or personal computers, tablets, smart phones, other types of convertible or hybrid devices, and the like. Keyboards are most commonly used by individuals to provide typing inputs to their device. These typing inputs may be used to construct word documents, communicate with other individuals, fill out forms, etc.

BRIEF SUMMARY

In summary, one aspect provides a method, comprising: receiving, on a keyboard of an information handling device, typing input from a user, wherein the typing input comprises at least one letter; determining, using a processor, at least one completion suggestion stemming from the at least one letter; and presenting, responsive to the determining, the at least one completion suggestion to the user, wherein the presented at least one completion suggestion comprises at least one animation portraying a signed motion corresponding to the at least one completion suggestion.

Another aspect provides an information handling device, comprising: a processor; a memory device that stores instructions executable by the processor to: receive typing input from a user, wherein the typing input comprises at least one letter; determine at least one completion suggestion stemming from the at least one user; and present, responsive to the determining, the at least one completion suggestion to the user, wherein the presented at least one completion suggestion comprises at least one animation portraying a signed motion corresponding to the at least one completion suggestion.

A further aspect provides a product, comprising: a storage device that stores code, the code being executable by a processor and comprising: code that receives typing input from a user, wherein the typing input comprises at least one letter; code that determines at least one completion suggestion stemming from the at least one letter; and code that presents, responsive to the determining, the at least one completion suggestion to the user, wherein the presented at least one completion suggestion comprises at least one animation portraying a signed motion corresponding to the at least one completion suggestion.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
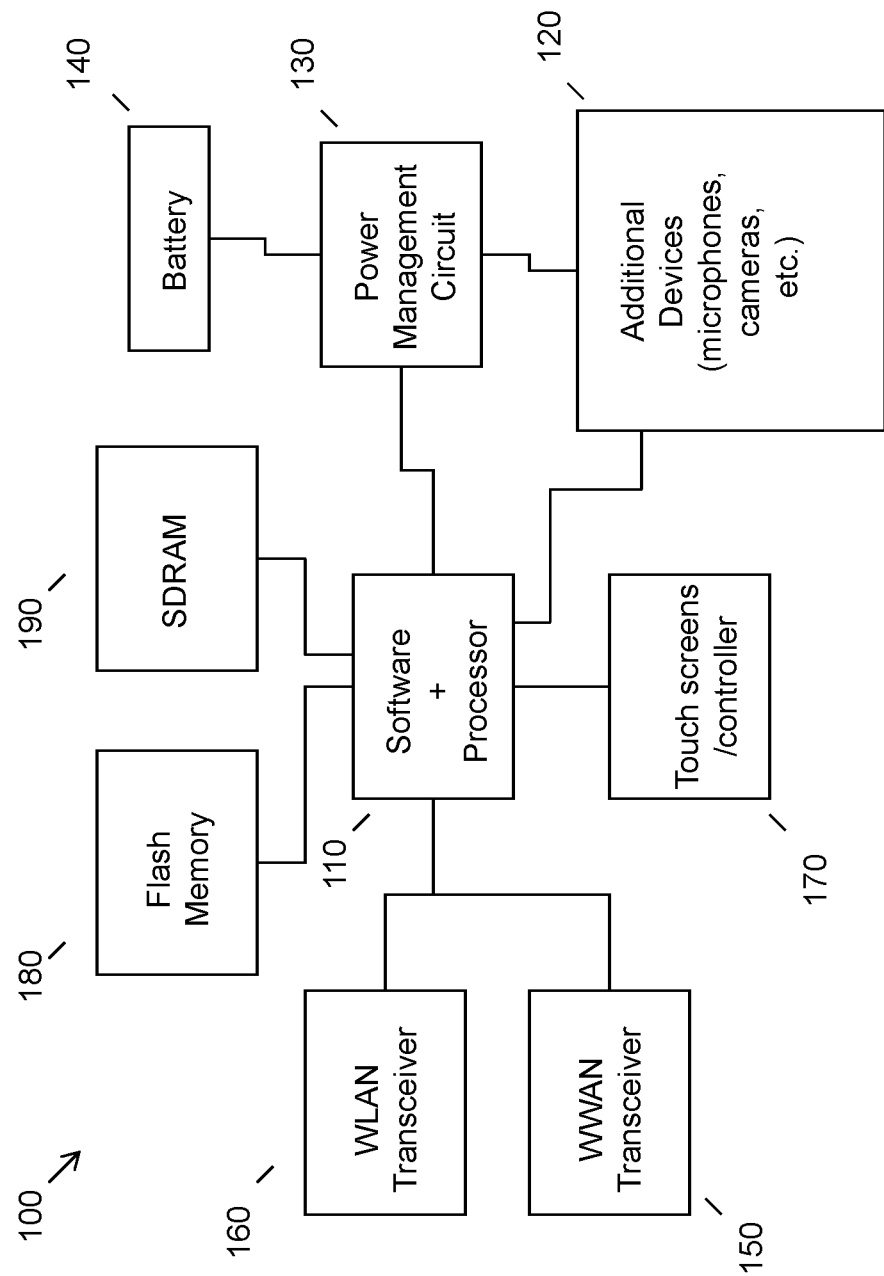
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although conventional physical and/or virtual keyboards ("keyboards") provide users with a popular way to provide typing inputs to devices, these input means alone may not be enough for certain users to effectively craft contextually appropriate words, sentences, and documents. For example, although hearing impaired individuals may be able to physically use a keyboard, they may not be able to construct grammatically correct words or sentences, especially if they are illiterate, or mildly literate, in the language in which they are typing.

Existing solutions for the foregoing issue are nearly all time-consuming and burdensome. For instance, certain applications exist that are tailored toward hearing impaired individuals. These applications may present the users with one or more character illustration images (e.g., generated from the American Sign Language alphabet, etc.) that the user may select. Thereafter, the selected character may be added to an input field. Alternatively, the selected character may be correlated with an alphanumerical letter, word, or number, which may itself then be added to an input field. Although these techniques allow hearing-impaired individuals to utilize the keyboard to construct words or strings of signed images, they do not provide the user with any confirmation the letters, words, or phrases they are constructing are contextually appropriate.

Accordingly, an embodiment provides a method for presenting a contextually informative completion suggestion to a user. In an embodiment, typing input may be received from a user at a keyboard associated with a device (e.g., a physical keyboard, a virtual keyboard, a projected keyboard, etc.). The typing input may contain at least one letter. An embodiment may then determine at least one completion suggestion (e.g., another letter, a word, etc.) that stems from the at least one letter and thereafter present the completion suggestion to the user. In an embodiment, the completion suggestion may contain an animation that portrays a signed motion associated with the completion suggestion. Such an animation may provide an indication to a user (e.g., a hearing impaired user having knowledge of sign language, etc.) that the automatically presented completion suggestion for the letter or word is what the user intended.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
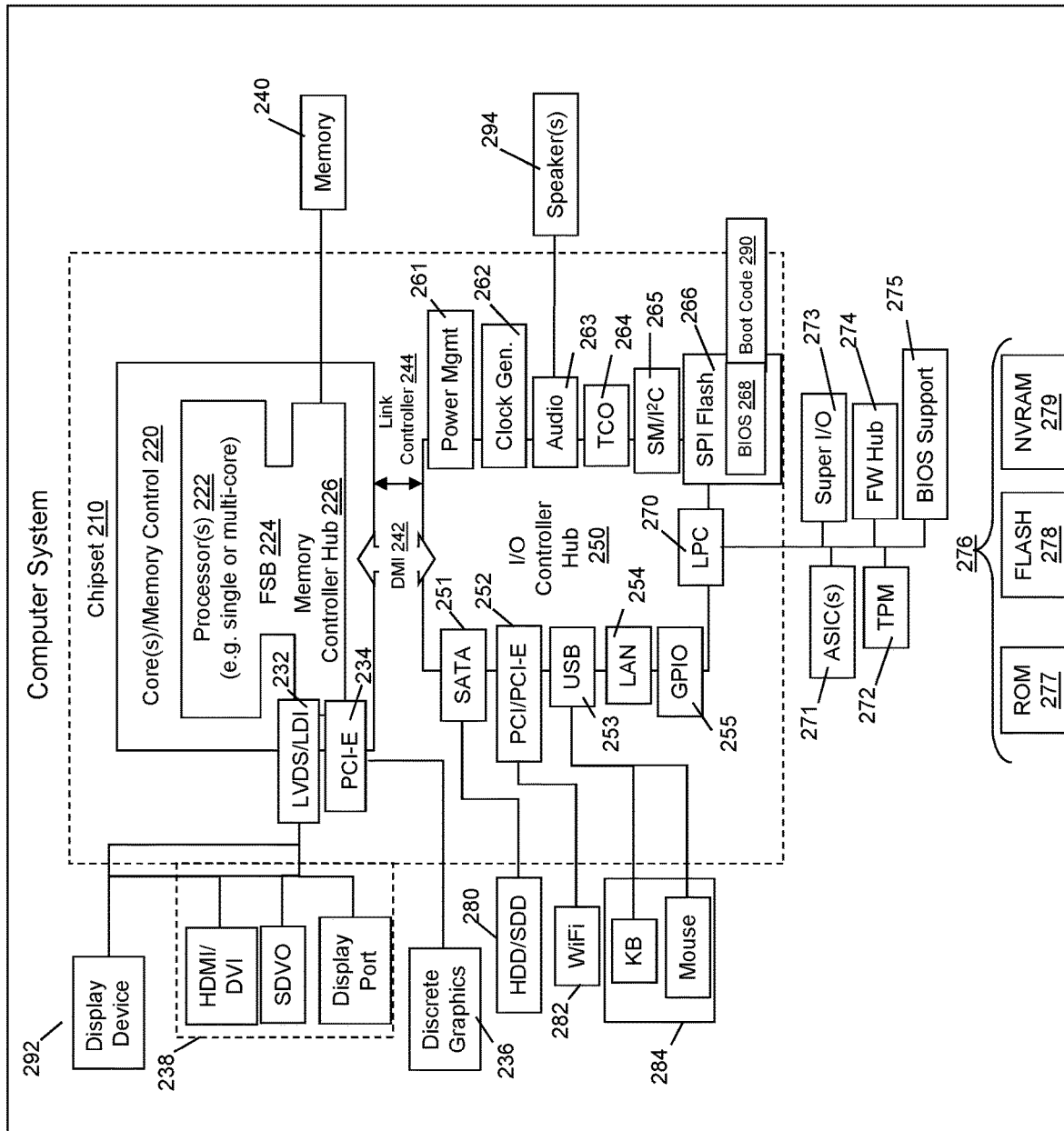
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving typing inputs from a physical or virtual keyboard. For example, the circuitry outlined in FIG. 1 may be implemented in a smart phone or tablet embodiment, whereas the circuitry outlined in FIG. 2 may be implemented in a laptop computer.

Figure 3:
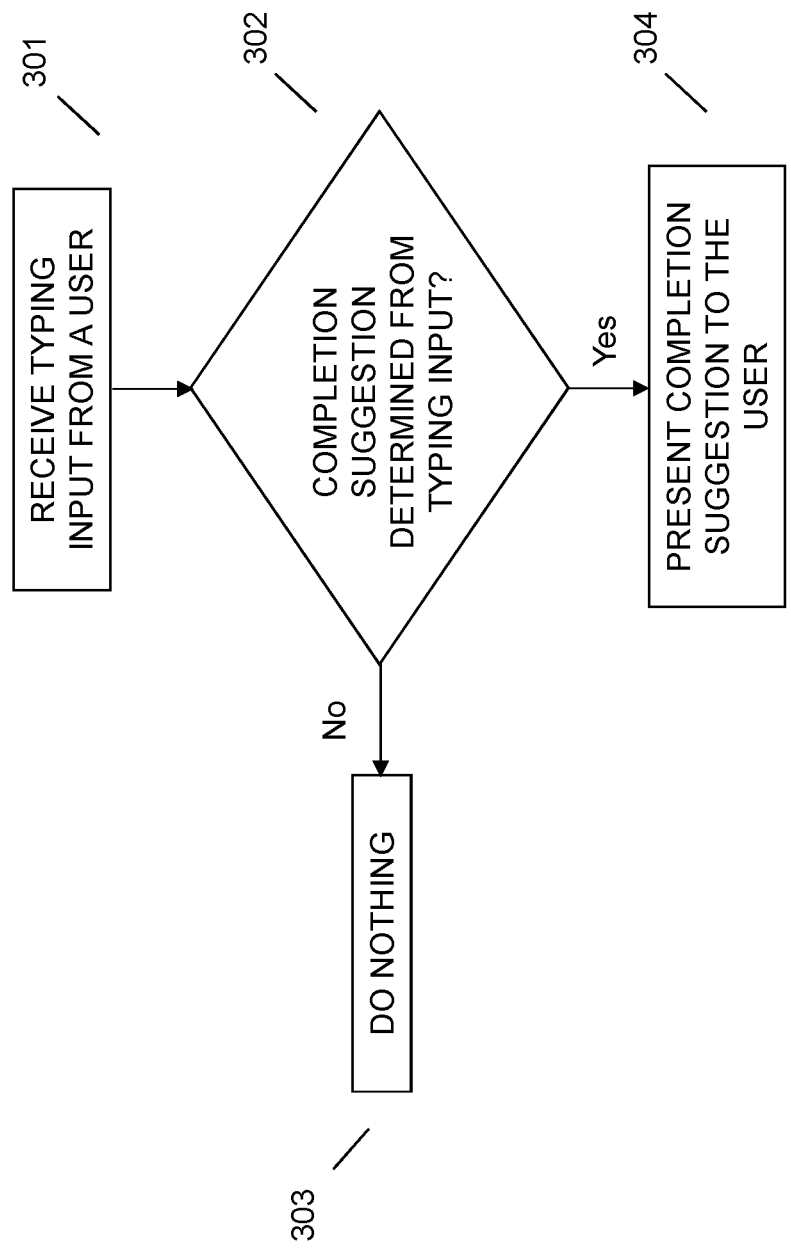
FIG. 3 illustrates an example method of presenting a completion suggestion to a user.

Referring now to FIG. 3, a method for presenting a completion suggestion to a user is provided. In an embodiment, typing input may be received from a user at a keyboard associated with a user's device. In an embodiment, the keyboard may be a physical keyboard (e.g., positioned on a C-cover of a user's clamshell device, a detached keyboard connected to the user's device via wired or wireless means, etc.) or a virtual keyboard (e.g., displayed on a touch sensitive display of the user's device, etc.). In an embodiment, the typing input may be provided to an input field of an application and contains at least one letter.

At 302, responsive to receiving the typing input, an embodiment may determine whether at least one completion suggestion exists. In the context of this application, the completion suggestion may be a suggestion, derived by the system, of another letter, series of letters, or a complete word that most likely follows, or stems from, the originally typed letter. Stated differently, the completion suggestion may attempt to predict the next letter, series of letters, or the entirety of the word, the user began typing. In an embodiment, the prediction of the next letter or word may be derived using conventional auto-complete methods known in the art.

Responsive to not being able to determine, at 302, a completion suggestion for the typed letter, an embodiment may, at 303, take no additional action. Conversely, responsive to determining, at 302, a completion suggestion for the typed letter, an embodiment may, at 304, present the completion suggestion to the user. In an embodiment, only a single completion suggestion may be provided to the user (e.g., the highest confidence completion suggestion, etc.). Alternatively, two or more completion suggestions may be provided to the user. In an embodiment, these multiple completion suggestions may be presented to the user in a ranked list (e.g., where the top choice is the highest confidence completion suggestion, etc.). In an embodiment, the completion suggestion(s) may be presented to the user automatically (i.e., after such a suggestion is identified), without receiving any additional user input to do so.

In an embodiment, the presentation of the completion suggestion may include the predicted letter, series of letters, or word that the system predicts most likely stems from the originally typed letter. Additionally, the completion suggestion may contain an animation that portrays a signed motion corresponding to the letter, series of letters, or word associated with the completion suggestion. More particularly, the animation may be either a cartoon animation of a character, or a live action video of a human individual, performing the correct sign language motion that corresponds to the suggested letter, series of letters, or word. In an embodiment, the completion suggestion may be provided in a small pop-up notification box and may contain both, the verbal suggestion as well as the animation. Assuming a hearing impaired user is familiar with their native sign language, this animation may provide a confirmation to them that the suggested letter, series of letters, or completed word was what they intended it to be.

Figure 4:
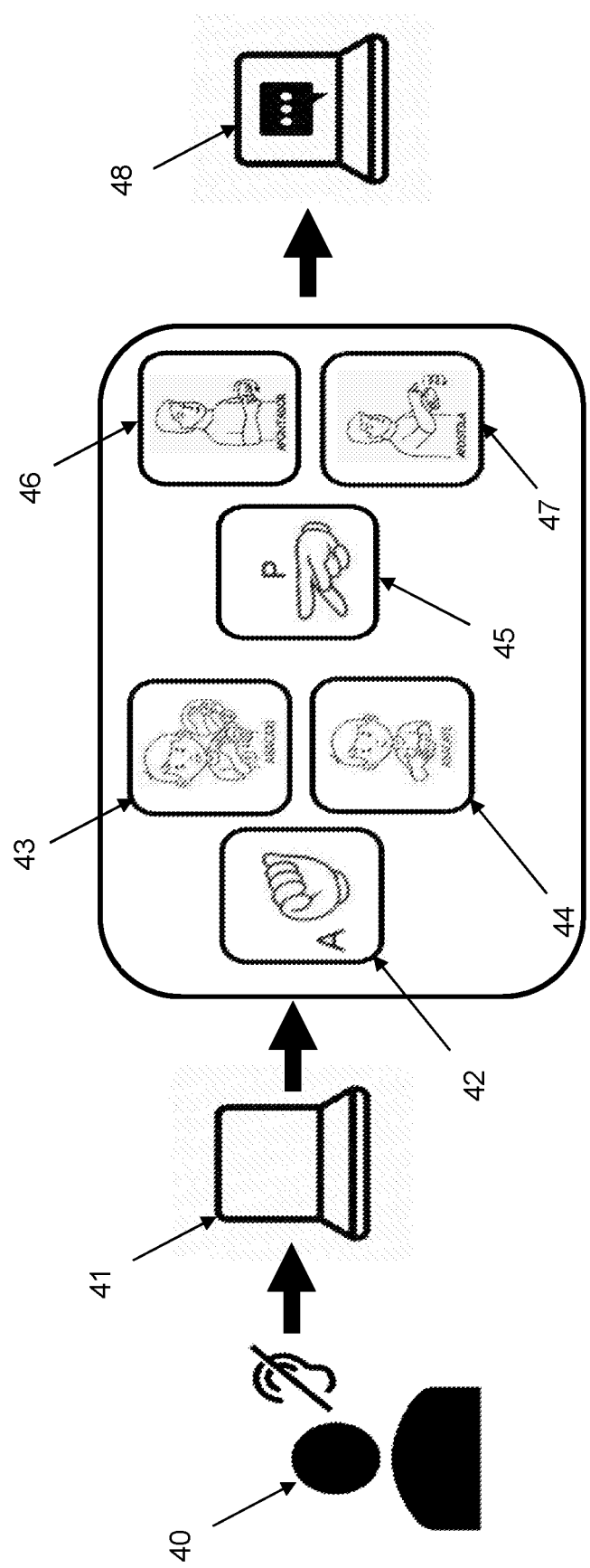
FIG. 4 presents a visual illustration of how a completion suggestion may be presented to a user.

Turning now to FIG. 4, a non-limiting example of the foregoing is provided. In an embodiment, a hearing impaired user 40 may interact with a device 41 that has a physical or virtual keyboard. The user 40 may desire to type in the Portuguese word, "Apontador", which means "sharpener" in English. To accomplish this, the user 40 may input a first typed letter 42, "a". Responsive to receiving the first typed letter 42, the system may generate two completion suggestions for the user. At 43, the system provides the completion suggestion, "Abacaxi", which means "pineapple" in English. At 44, the system provides the completion suggestion, "Abacate", which means "avocado" in English. In each of the completion suggestions, an animation is provided along with the suggested completed word that shows the sign language performance of the suggestion (i.e., for 43, the animation shows the sign language performance of "Abacaxi" and for 44, the animation shows the sign language performance of "Abacate").

Neither of the completion suggestions provided at 43 or 44 corresponded to the intended word the user 40 wanted to type. Accordingly, the user 40 may type a second letter 45, "p". Upon receipt of the second letter 45, the system may update its suggestion pool and provide two new completion suggestions. At 46, the system provides the completion suggestion "Apontador", which is the word the user intended to type. At 47, the system provides the completion suggestion, "Apostila", which means "handout" in English. Upon examination of the sign language animation at 46, the user may confirm that the completion suggestion at 46 corresponds to the word they intended to type. The user 40 may thereafter select (e.g., using touch input, cursor input, etc.) the completion suggestion at 46. Upon selection, the word provided in the completion suggestion may be input into a relevant input field 48.

In an embodiment, the letter, series of letters, or complete word, as well as the sign language motion associated with the foregoing, presented in the completion suggestion may vary depending upon a location of the device. More particularly, the textual component of the completion suggestion may be different based upon the language the user is typing in. Additionally, there is no universal sign language and different sign languages are used in different countries or regions. Accordingly, an embodiment may identify the global location of the device (e.g., the country or region the device is located in, etc.) using one or more conventional location determination techniques (e.g., Global Positioning System (GPS) data, Wi-Fi signal data, etc.) and thereafter augment the contents of completion suggestion to be consistent with that determined location. Stated differently, the suggested letters or words may be contextually appropriate for a predominant language spoken in that determined location and the animation may be a sign language motion, native to the determined location, for those contextually appropriate letters or words.

In an embodiment, after a user has selected a completion suggestion and a completed word has been input into an underlying application, a user may still access the animation associated with the input word. More particularly, a user may select a word in the application (e.g., by clicking on it, by hovering a cursor over it, etc.) and, upon detecting this selection, the system may present the user with the sign language animation corresponding to the selected word. Such an embodiment may allow a user to confirm that the words in an input sentence are contextually appropriate and are what the user intended to have.

The various embodiments described herein thus represent a technical improvement to conventional methods for providing auto-complete suggestions to users. Using the techniques described herein, an embodiment may first receive typing input from a user (e.g., a hearing impaired user, etc.), where the typing input contains at least one letter. An embodiment may then determine a completion suggestion of a word based upon the at least one letter and thereafter present that completion suggestion to the user. In an embodiment, the completion suggestion may contain an animation of the sign language equivalent of the suggested word so that the user can confirm that the suggested word is equivalent to an intended word. Upon receiving a confirmation selection from the user, the completion suggestion may be provided to an input field of an underlying application. Such a method may provide the user with more context in order to ensure that the auto-completed suggestions correspond to words the user actually intended to provide into an application.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, on a keyboard of an information handling device, typing input from a user, wherein the typing input comprises a letter;
   identifying, using location data associated with the information handling device, a geographic location of the user;
   determining, using a processor and based on a predominant language associated with the identified geographic location, at least one completion suggestion stemming from the letter, wherein the at least one completion suggestion corresponds to a complete word; and
   presenting, responsive to the determining, the at least one completion suggestion to the user, wherein the at least one completion suggestion is presented in a notification box positioned proximate to the typed letter and comprises an indication of the complete word and at least one animation portraying a signed motion corresponding to the complete word;
   wherein the signed motion for the complete word portrayed in the at least one animation is dependent on a predominant sign language system associated with the geographic location.

2. The method of claim 1, wherein the determining the at least one completion suggestion comprises accessing a database comprising a plurality of completion suggestions.

3. The method of claim 2, wherein the plurality of completion suggestions in the database are derived from location data associated with the information handling device.

4. The method of claim 1, wherein the presenting comprises automatically presenting without any additional user input.

5. The method of claim 1, wherein the at least one animation is a cartoon animation.

6. The method of claim 1, wherein the at least one animation is a live action portrayal of the signed motion.

7. The method of claim 1, further comprising:
   receiving, from the user, a selection of the at least one completion suggestion; and
   inputting, responsive to receiving the selection, the at least one completion suggestion into an input field presented on the information handling device.

8. The method of claim 7, further comprising:
   detecting a cursor selection on the inputted at least one completion suggestion; and
   presenting, responsive to the detecting, the at least one animation corresponding to the at least one completion suggestion.

9. An information handling device, comprising:
   a processor;
   a memory device that stores instructions executable by the processor to:
   receive typing input from a user, wherein the typing input comprises a letter;
   identify, using location data associated with the information handling device, a geographic location of the user;
   determine, based on a predominant language associated with the identified geographic location, at least one completion suggestion stemming from the letter, wherein the at least one completion suggestion corresponds to a complete word; and present, responsive to the determining, the at least one completion suggestion to the user, wherein the at least one completion suggestion is presented in a notification box positioned proximate to the typed letter and comprises an indication of the complete word and at least one animation portraying a signed motion corresponding to the complete word;

wherein the signed motion for the complete word portrayed in the at least one animation is dependent on a predominant sign language system associated with the geographic location.

10. The information handling device of claim 9, wherein the instructions executable by the processor to determine the at least one completion suggestion comprise instructions executable by the processor to access a database comprising a plurality of completion suggestion.

11. The information handling device of claim 10, wherein the plurality of completion suggestions in the database are derived from location data associated with the information handling device.

12. The information handling device of claim 9, wherein the at least one animation is a cartoon animation.

13. The information handling device of claim 9, wherein the at least one animation is a live action portrayal of the signed motion.

14. The information handling device of claim 9, wherein the instructions are further executable by the processor to:
   receive, from the user, a selection of the at least one completion suggestion; and
   input, responsive to receiving the selection, the at least one completion suggestion into an input field presented on the information handling device.

15. The information handling device of claim 14, wherein the instructions are further executable by the processor to: detect a cursor selection on the inputted at least one completion suggestion; and present, responsive to the detecting, the at least one animation corresponding to the at least one completion suggestion.

16. A product, comprising:
   a storage device that stores code, the code being executable by a processor and comprising:
   code that receives typing input from a user at an information handling device, wherein the typing input comprises a letter;
   code that identifies, using location data associated with the information handling device, a geographic location of the user;
   code that determines, based on a predominant language associated with the identified geographic location, at least one completion suggestion stemming from the letter, wherein the at least one completion suggestion corresponds to a complete word; and
   code that presents, responsive to the determining, the at least one completion suggestion to the user, wherein the at least one completion suggestion is presented in a notification box positioned proximate to the typed letter and comprises an indication of the complete word and at least one animation portraying a signed motion corresponding to the complete word;
   wherein the signed motion for the complete word portrayed in the at least one animation is dependent on a predominant sign language system associated with the geographic location.

* * * * *